April 26, 1955 G. W. SHULTS 2,707,123
CLAMPING RING
Filed Feb. 1, 1952 2 Sheets-Sheet 2
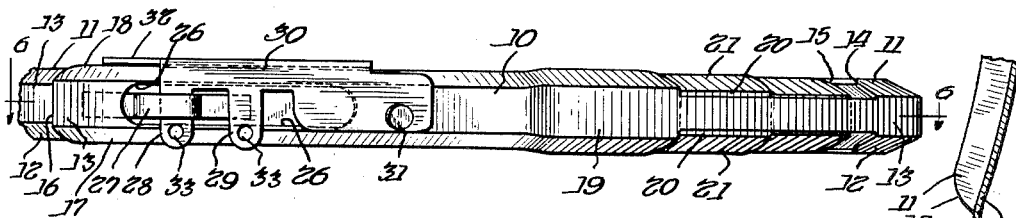
Fig. 5.
Fig. 6.
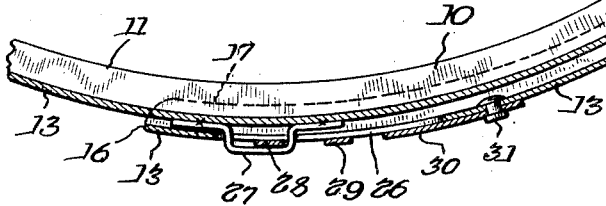
Fig. 7.
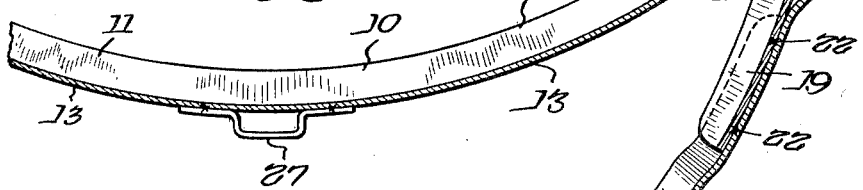
Inventor.
George W. Shults.
By Wilkinson, Huxley, Byron & Hume
Attys.

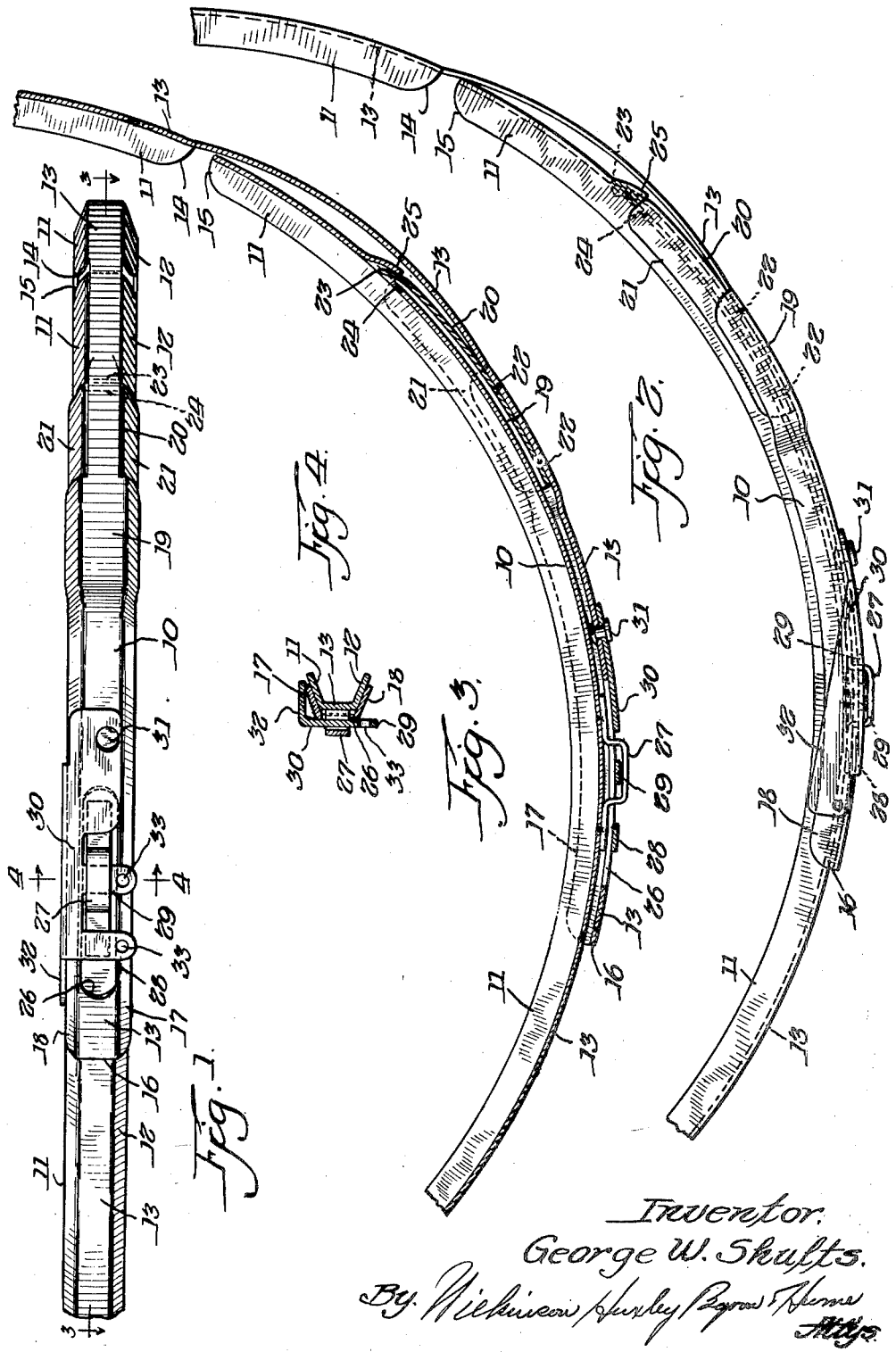

United States Patent Office 2,707,123
Patented Apr. 26, 1955

2,707,123

CLAMPING RING

George W. Shults, Flossmoor, Ill., assignor to Brasco Manufacturing Company, Harvey, Ill., a corporation of Delaware Application February 1, 1952, Serial No. 269,383

6 Claims. (Cl. 292—256.69)

My invention relates to a combined locking and sealing ring and has particular reference to a sealing ring adapted for use in connection with metallic containers or drums and in which one end is permanently closed while the opposite end is normally open with a removable closure member being provided, which is fitted against the end of the container with a closure ring such as I have provided placed around the periphery of the cover and in engagement therewith and over the flange around the open end of the container with the ring being contracted after being placed in position so as to clamp the closure member against the flange of the barrel and seal it in position with a compressible gasket interposed between the closure member and the flange of the container and which upon once being compressed loses its elasticity to such an extent that it can not be used again, which type of containers and seals are old and well known in the art.

A further object of my invention is the provision of a sealing ring in which provision is made for assembling the container, the closure member and the ring in assembled relation while empty for shipping and transporting purposes and in which the ring is used in such manner that the unit remains assembled for shipping purposes but in which the gasket is not compressed or is compressed only a very slight degree so that it remains in condition for use for sealing the container after the container has been filled and the sealing ring replaced.

Another and further object of my invention is the provision of a sealing ring having an external contour of such fashion that the containers upon which these rings are used can be rolled over a floor surface or can be stacked or racked in regular order without the fastening portion of the ring throwing the container out of round, so that it can be rolled smoothly over a floor or racked in end to end relation without the fastening members interfering either with the rolling of the container or racking them in end to end relation as may be desired.

Another and further object of my invention is the provision of a locking ring which provides a locking structure, which is capable of having a seal placed therein which holds the ring in assembled relation and enables the purchaser to know that the contents of the container have not been tampered with if the seals are received in unbroken condition when final delivery of the container is made.

These and other objects of my invention will be further and better understood by reference to the accompanying drawings, and in which Figure 1 is an edge elevational view of the locking portion of a sealing ring embodying my invention;

Figure 2 is a side elevation of the free ends of the ring and locking mechanism shown in Figure 1;

Figure 3 is a sectional view taken on lines 3, 3 of Figure 1;

Figure 4 is a cross sectional view taken on lines 4, 4 Figure 1;

Figure 5 is an elevational view of the locking portion of the ring showing the ring in assembled position for shipment;

Figure 6 is a longitudinal sectional view on line 6, 6 of Figure 5;

Figure 7 is a sectional view similar to Figure 6 except that the portions of the sealing mechanism are shown in position for final sealing of the ring just before it is to be closed and locked into position.

Referring now specifically to the drawings and in which like reference characters refer to like parts throughout, a ring 10 is provided which is circular in form but which for convenience and legibility only, the overplaced ends and locking mechanism only are illustrated in the drawings because the body portion of the ring beyond the end portions is similar in contour to the end portions, and which consists of angularly positioned side walls 11 and 12 having a web 13 connecting the said side walls 11 and 12 with the web 13 being widened sufficiently so that the side walls 11 and 12 of the ring engage the edge of the cover of the container and also over the flange of the container and upon the ring being contracted the angular position of the side walls 11 and 12 forces the cover and edge of the container in tightly closed and sealed arrangement. The ends of the side walls 11 and 12 terminate short of each other as shown at 14 and 15 in Figs. 2 and 3 with the web 13 being continued in overlapped relation upon the same web portion 13 of the opposite or underlapped end of the ring 10 to a point 16 with side wings 17 and 18 being provided which are of the same contour and of the same general relation as the side walls 11 and 12 and which are fitted over these portions 11 and 12 when the ring is in closed position as shown particularly in Fig. 4. A fulcrum member designated as a whole as 19 is provided which is the same shape in cross section as the body of the ring and has a web portion 20 from which depending flange portions 21, 21 extend, these flange portions 21, 21 of the member 19 being fitted over the side portions 11 and 12 of the body of the ring 10 and serve as guides to insure the proper placement of the fulcrum member 19 in adjusting the ring on to the container for closure purposes. The fulcrum member 19 is spot welded to the underside of the web 13 at 22, 22 with one end of the fulcrum member 19 being free with the free end having a tang 23 thereon adapted to engage into an opening 24 formed in the web 13 and against a struck up portion 25 of the web 13 to form a pivot point for the sealing of the container after the container has been filled and its cover placed in position on the container. One of the ends of the web 13 has a slot 26 therein which is adapted to receive a slightly elongated loop 27 welded or otherwise secured to the overlapped portion of the web 13 and spaced from its other free end of the ring, which said loop 27 projects through the slot 26 to receive spaced locking legs 28 and 29 integrally formed with a laterally pivoted locking member 30 secured to the web 13 by means of a rivet 31, the locking member 30 having a triangular shaped skirt portion 32 integrally formed therewith which engages the wing portions 17 forming one of the guide members of the web 13 where it overlaps the free end of the ring. The locking legs 28 and 29 have openings 33, 33 therein through which appropriate seals may be placed thus insuring that the container cannot be opened unless the seals are broken so the ultimate purchaser may be sure that the original package has reached him with the contents of the container being in proper amount and form. In operation of the ring 10 for manual placing on the container, the fastening device 30 is moved laterally so the legs 28 and 29 are free of the loop 27, the ring opened so the tang 23 is out of the recess 24, and thence opened by separating the ends of the ring either by pulling them outward in a plane parallel with the ring, or by movement of the free ends laterally for a short distance, the ring can be placed in position over the head on the end of the container and the cover, the ring compressed around these parts until the projection 28 is opposite the loop 27, the locking member 30 moved laterally until the projection 28 extends through the loop 27, in which condition the container, cover and ring are in unit relation for shipment without the gasket being so compressed that it cannot be used for the final sealing of the container.

When the container is about to be filled the cover is removed from the container by a reversal of the operations described above, and when the container is filled the cover is placed in position, the ring also placed thereon and the tang 23 placed in the opening 24 and pressure placed on the free end of the overlapped ring until the ring is in closed position with the locking projection 29 opposite the loop 27 when the locking member 30 is moved in a counterclockwise direction until the projection 29 extends through the loop 27 in which condition the gasket is compressed and the container sealed. During this latter operation the tightening of the ring may be assisted by striking the ring along its sides with a mallet or with a piece of wood so the ends of the ring can be drawn tightly together and locked as shown in Figure 1. When in locked sealed relation a sealing or locking wire can be placed through the opening 33 in the end of the projection 29 so that the ring cannot be opened or removed from the container without such seal being broken.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A sealing ring comprising a body portion having a central web and depending side portions connected with the said web with end portions in overlapped relation with each other, the outer free end portion of the sealing ring having a loop receiving slot therein, the other end portion having a tang receiving opening therein, a fulcrum member of substantially the same cross sectional contour as the body of the ring secured to the outer free end portion of the ring and having a tang at one end thereof, a loop mounted in the web portion of the inner free end and a laterally pivoted locking member mounted on the outer free end of the ring having a plurality of locking projections thereon, the said projections being selectively mounted through the said loop whereby the sealing ring may be locked in a plurality of positions.

2. A sealing ring comprising a body portion having a central web and depending side portions connected with the said web with end portions in overlapped relation with each other, the outer free end having a loop receiving slot therein, the other end portion having a tang receiving opening therein, a fulcrum member of substantially the same cross sectional contour as the body of the ring secured to the outer free end portion of the ring and having a tang at one end thereof, a loop mounted in the web portion of the inner free end and a laterally pivoted locking member mounted on the outer free end of the ring having a plurality of locking projections thereon, the said projections being selectively mounted through the said loop whereby the sealing ring may be locked in a plurality of positions, a portion of the outer free end having its side walls removed for a portion of its length whereby the web portion of the ring may be flexed for a plurality of adjustments.

3. A sealing ring comprising in combination a ring of channel form in cross section having its ends overlapped and secured together in selected positions, the outer overlapped end having a flexible web adjacent the points of juncture of the body of the ring and having an elongated loop receiving slot therein adjacent its free end with wing portions on its sides for guiding and anchoring purposes, a fulcrum member secured to the outer end portion of the ring having a tank at one of its ends, the inner end portion of the ring having a struck up portion to receive the said tang whereby the fulcrum member may be disconnected from the inner end portion of the ring, a laterally movable locking member pivotally secured to the web of the outer end portion of the ring having a plurality of locking projections thereon, and a loop secured to the inner end portion and adapted to extend through the slot in the free end of the outer portion of the ring and to selectively receive the projections on the locking member.

4. A sealing ring comprising in combination a ring of channel form in cross section having its ends overlapped and secured together in selected positions, the outer overlapped end having a flexible web adjacent the points of juncture of the body of the ring and having an elongated slot adjacent its free end with wing portions on its sides for guiding and anchoring purposes, a fulcrum member secured to the outer end portion of the ring having a tang at one of its ends, the inner end portion of the ring having a struck up portion to receive the said tang, a laterally movable locking member pivotally secured to the web of the outer end portion of the ring having a plurality of locking projections thereon, and a loop secured to the inner end portion and adapted to extend through the slot in the free end of the outer portion of the ring and to selectively receive the projections on the locking member, whereby the ends of the ring may be locked together with the tank in either engaged position with the struck up portion on the inner ring or in out of engaged position with said struck up portion.

5. A sealing ring comprising a body portion arcuate in cross-sectional contour throughout the major portion of its length and having an overlapped end portion with an opening therein adjacent its end and an underlapped end portion, the underlapped portion having a tang receiving opening therein, a fulcrum member secured to the overlapped end having a tang on one end thereof adapted to be removably received in the tank receiving opening in the underlapped portion of the ring, a loop mounted on the underlapped portion of the ring and adapted to extend through the opening in the overlapped portion and a holding member having a plurality of legs thereon adapted to selectively extend through the said loop whereby the overlapped and underlapped portion of the ring are secured together.

6. A sealing ring comprising a body portion arcuate in cross-sectional contour throughout the major portion of its length and having an overlapped end portion with an opening therein adjacent its end and an underlapped end portion, the underlapped portion having a tang receiving opening therein, a fulcrum member secured to the overlapped end having a tang on one end thereof adapted to be removably received in the tang receiving opening in the underlapped portion of the ring and co-operating fastening means on the overlapped portion of the said ring and the underlapped portion whereby the free end of the overlapped portion is secured to the underlapped ring in a plurality of selected positions.

References Cited in the file of this patent

UNITED STATES PATENTS

| | | |
|---|---|---|
| 478,120 | Mead | July 5, 1892 |
| 956,281 | Buckius | Apr. 26, 1910 |
| 1,695,487 | Hadley | Dec. 18, 1928 |
| 1,970,041 | Johnson | Aug. 14, 1934 |
| 2,024,487 | Tost | Dec. 7, 1935 |
| 2,029,173 | Jesser | Jan. 28, 1936 |
| 2,303,625 | Ellis | Dec. 1, 1942 |
| 2,304,539 | Carpenter | Dec. 8, 1942 |

FOREIGN PATENTS

| | | |
|---|---|---|
| 443,853 | Great Britain | Mar. 9, 1936 |